(12) United States Patent
Tomikura et al.

(10) Patent No.: US 8,255,590 B2
(45) Date of Patent: Aug. 28, 2012

(54) IMAGE FILE TRANSFER APPARATUS THAT DETECT WHETHER TRANSFERRED IMAGE FILES TO AN EXTERNAL DEVICE HAS BEEN ABORTED OR NOT

(75) Inventors: Yoshihiro Tomikura, Osaka (JP); Masafumi Nosaka, Osaka (JP); Ryohei Wakai, Osaka (JP); Ryohei Kinugawa, Osaka (JP)

(73) Assignee: Panasonic Corporation, Osaka (JP)

( * ) Notice: Subject to any disclaimer, the term of this patent is extended or adjusted under 35 U.S.C. 154(b) by 420 days.

(21) Appl. No.: 12/497,041

(22) Filed: Jul. 2, 2009

(65) Prior Publication Data

US 2010/0005348 A1    Jan. 7, 2010

(30) Foreign Application Priority Data

Jul. 3, 2008   (JP) ................. 2008-174162

(51) Int. Cl.
*G06F 13/00* (2006.01)
*G06F 12/02* (2006.01)
*G06F 12/16* (2006.01)

(52) U.S. Cl. ............... 710/20; 710/14; 710/72; 710/73; 710/74; 714/57; 711/162; 711/166; 711/E12.002; 711/E12.103; 711/E11.025

(58) Field of Classification Search ............... 710/20, 710/72–74, 14; 714/57; 711/162, 166, E12.002, 711/E12.103, E11.025
See application file for complete search history.

(56) References Cited

U.S. PATENT DOCUMENTS

| 7,385,635 | B2 * | 6/2008 | Kobayashi et al. | 348/231.99 |
| 7,710,490 | B2 * | 5/2010 | Hara et al. | 348/333.05 |
| 7,791,742 | B2 * | 9/2010 | Ohshima | 358/1.1 |
| 7,912,994 | B2 * | 3/2011 | Cornwell et al. | 710/14 |

FOREIGN PATENT DOCUMENTS

JP       2002-369121       12/2002

* cited by examiner

*Primary Examiner* — Tammara Peyton
(74) *Attorney, Agent, or Firm* — McDermott Will & Emery LLP

(57) ABSTRACT

Even if a write operation onto a storage media on an external storage device is interrupted, consistency of management information on the storage media is improved. An image file transfer device includes a transferor which transfers an image file stored on a storage media to an external device, a retriever which obtains management information in relation to a file system from a storage media included in the external device, before the transfer of the image file by the transferor, a non-volatile storage which stores the management information obtained by the retriever, and a deleter which deletes the management information stored in the non-volatile storage in response to a completion of the transfer of the image file by the transferor.

5 Claims, 9 Drawing Sheets

IMAGE FILE TRANSFER APPARATUS THAT DETECT WHETHER TRANSFERRED IMAGE FILES TO AN EXTERNAL DEVICE HAS BEEN ABORTED OR NOT

CROSS-REFERENCE TO RELATED APPLICATION

This application claims priority from Japanese Patent Application No. JP2008-174162 filed on Jul. 3, 2008, and the disclosure thereof, including its specification, its drawings, and its claims, is hereby incorporated by reference in its entirety for all purposes.

BACKGROUND

This disclosure relates to technology for storing files stored in an electronic device onto a media on an external device connected to the device.

Technology to transfer data between a plurality of storage media is widely used in general. For example, in Japanese Unexamined Patent Application Publication No. 2002-369121, an electronic camera which transfers image data from a memory card to a hard disk is disclosed. In detail, this electronic camera is configured to transfer all the image data recorded in the memory card to the hard disk, when the remaining capacity of the memory card reaches a predetermined value. Due to this, this electronic camera reduces a repetition frequency of start/stop of a rotating drive unit for rotating the hard disk, thereby minimizing power consumption.

However, the above-mentioned Publication does not mention a case where a transfer of image data is interrupted. If a transfer of image data is interrupted, inconsistency between the content of management information on a destination storage media and the content of image data actually stored on the destination storage media may occur. In such case, the content of management information on the destination storage media and/or the content of image data actually stored on the destination storage media must be changed to ensure consistency. As a prerequisite for this, whether a transfer of image data has been aborted or not needs to be detected.

SUMMARY

The present invention aims at providing an image file transfer device which can detect with relative ease whether a transfer of image data to an external device has been aborted or not.

In accordance with an embodiment of the present invention, an image file transfer device includes a transferor which transfers an image file stored on a storage media to an external device, a retriever which obtains management information in relation to a file system from a storage media included in the external device before the transfer of the image file by the transferor, a non-volatile storage which stores the management information obtained by the retriever, and a deleter which deletes the management information stored in the non-volatile storage in response to a completion of the transfer of the image file by the transferor.

In accordance with another embodiment, the image file transfer device may further include a recorder which records a backup of the management information stored on the storage media included in the external device onto the storage media included in the external device before the transfer of the image file by the transferor.

In accordance with another embodiment, the image file transfer device may further include a detector which detects whether the management information exists or dose not exist in the non-volatile storage, before the transfer of the image file by the transferor, a determiner which determines whether the storage media included in the external device is or is not identical with the storage media onto which the image file was transferred the previous time based on the detected management information, if the detector has detected the management information, and a display which displays a message if the determiner has determined that it is not identical.

In accordance with the present invention, an image file transfer device which can detect with relative ease whether a transfer of image data to an external device has been aborted or not can be provided.

DETAILED DESCRIPTION

Definitions

Figure 1:
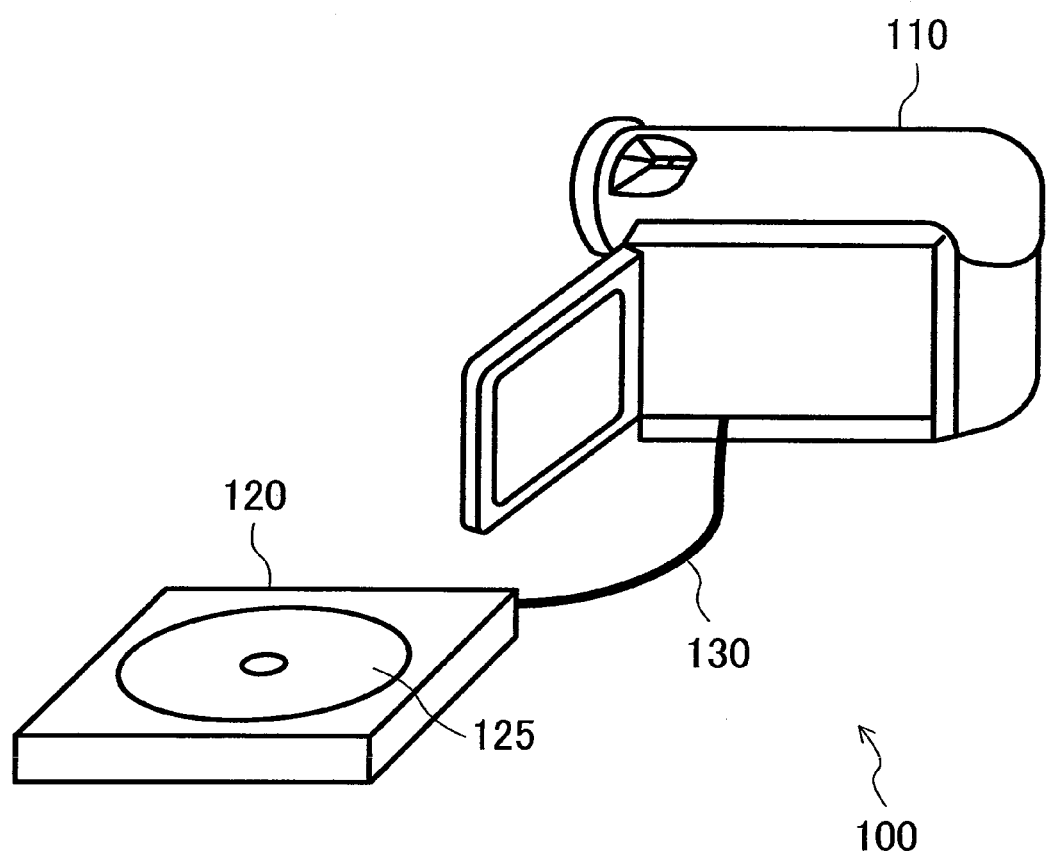
FIG. 1 is a diagram schematically illustrating an embodiment of a system in which the teaching of the present invention is embodied.

The definitions of terms used to explain example embodiments are described below.

A "file transfer system" includes a device which sends a file and a device which receives the file. A file transfer system also includes a communication link which couples these devices. A device which sends a file may be any of, but is not limited to, a video camera, a hard disk drive (HDD) recorder, a Blu-ray recorder, a digital audio player, etc. A device which receives a file may be any of, but is not limited to, a DVD (Digital Versatile Disc) writer (also referred to as a DVD burner), a memory card writer, etc. Such a device which receives a file is also referred to as an "external device" in this specification. In this specification, a file is typically an A/V file, which will be described later.

An "internal media" may be any storage media, which is volatile, non-volatile, removable, or non-removable, provided in a device which sends a file. Examples of such an internal media include a HDD and a RAM (Random Access Memory).

An "external media" may be any storage media, which is volatile, non-volatile, removable, or non-removable, provided in a device which receives a file. Typically, an external media may be any of, but is not limited to, a DVD, a BD (Blu-ray Disc), etc.

"Management information" may typically include, but is not limited to, content management information, file system management information, and latest storage information. As an alternative, management information may include other management information in addition to the information mentioned above.

"Content management information" is information required for initialization of applications, and includes, for example, a name of content, content generation time information, content size information, content playback time information, etc. This content management information may include information needed for generating a list of content which is stored in a main storage of a device (e.g., a buffer memory of a video camera, etc.).

"File system management information (FS management information)" is information to manage an file system. FS management information may include, but is not limited to, a file name, a file size, file property information, an address where a file is located on an external media, and the capacity of a storage media. Typically, FS management information associates a directory structure, described later referring to FIG. 3, with a storage location on a media.

"Latest storage information" is a part of FS management information. If a system uses UDF (Universal Disk Format) as a file system, latest storage information is an LVID (Logical Volume Integrity Descriptor). An LVID is a descriptor which should be written each time the content of a logical volume associated with it is changed. For example, an LVID describes the last date and time (timestamp) when a change is made in the logical volume, a file size, etc. An LVID includes data "Integrity Type." An Integrity Type represents either one of OPEN (a file write operation is in progress) and CLOSE (a file write operation has been completed). Therefore, the Integrity Type is changed to an OPEN state when a write operation to a media is started. The Integrity Type is returned to an CLOSE state when a write operation to a media is finished.

An "A/V file" is an electronic file, including at least one of data representing audio and data representing video. For example, such an A/V file may comply with standards such as MPEG-2, H.264, etc.

In this specification, an expression of "to record" or "to store" information means that the information is saved on a media. Such a media may be a disk media (e.g., a DVD, a BD, etc.), which is a rotating media, or may be a semiconductor media (e.g., a flash memory, etc.), which is a non-rotating media (also referred to as a solid state media).

Flowcharts in this specification illustrate processes to perform desired data processing. Such processes typically include a plurality of elements (i.e., steps). In this specification, the term "block" refers to one in which each step has been specifically realized (or a specific implementation). Therefore, a "block" in this specification corresponds to an act to implement a process. Such a "block" is typically implemented by software. Alternatively, a block may be implemented by hardware or a combination of software and hardware.

Now, example embodiments of a file transfer device will be described below in detail with reference to the drawings. The same or similar components in the drawings are indicated with same reference symbols.

(Overview)

FIG. 1 is a diagram illustrating a system 100 in accordance with an example embodiment of the present invention. The system 100 includes a video camera 110 (serves as a file transfer device) and a DVD (Digital Versatile Disc) writer 120 (serves as an external storage device). The system 100 is one example of a "file transfer system" described above. The video camera 110 is one example of a "device which sends a file." The DVD writer 120 is one example of a "device which receives a file" described above.

A user of the system 100 may transfer an A/V (audio/video) file obtained with the video camera 110 to the DVD writer 120, and store it on a DVD 125. In such case, the video camera 110 is connected with the DVD writer 120 using a USB cable 130.

The video camera 110 may alternatively be any device which outputs content such as image information, audio information, etc. to the DVD writer 120. For example, instead of the video camera 110, a digital still camera, a HDD (Hard Disk Drive) recorder, an IC (Integrated Circuit) recorder, etc. may be used.

The DVD writer 120 stores an electronic file on the DVD 125, which is an external storage media (also referred to as simply a media). Instead of the DVD 125, for example, a BD (Blu-ray Disc), a semiconductor memory card, etc. may be used. In such case, instead of the DVD writer 120, any storage device compatible with an alternative media 125 (a BD writer, a memory card writer, etc.) may be used. The DVD 125 is one example of an "external media" described above.

The USB cable 130 complies with an interface standard of USB (Universal Serial Bus) standard. Instead of the USB cable 130, interface technology based on HDMI (High-Definition Multimedia Interface), a wireless interface (e.g., an IEEE 802.11-compliant interface), etc. may be used.

The video camera 110 has a HDD therein. The HDD stores captured video on a hard disk as A/V (Audio/Video) data. The video camera 110 can obtain the time period allowed for storage based on the remaining capacity of the hard disk.

(Details of Video Camera)

Figure 2:
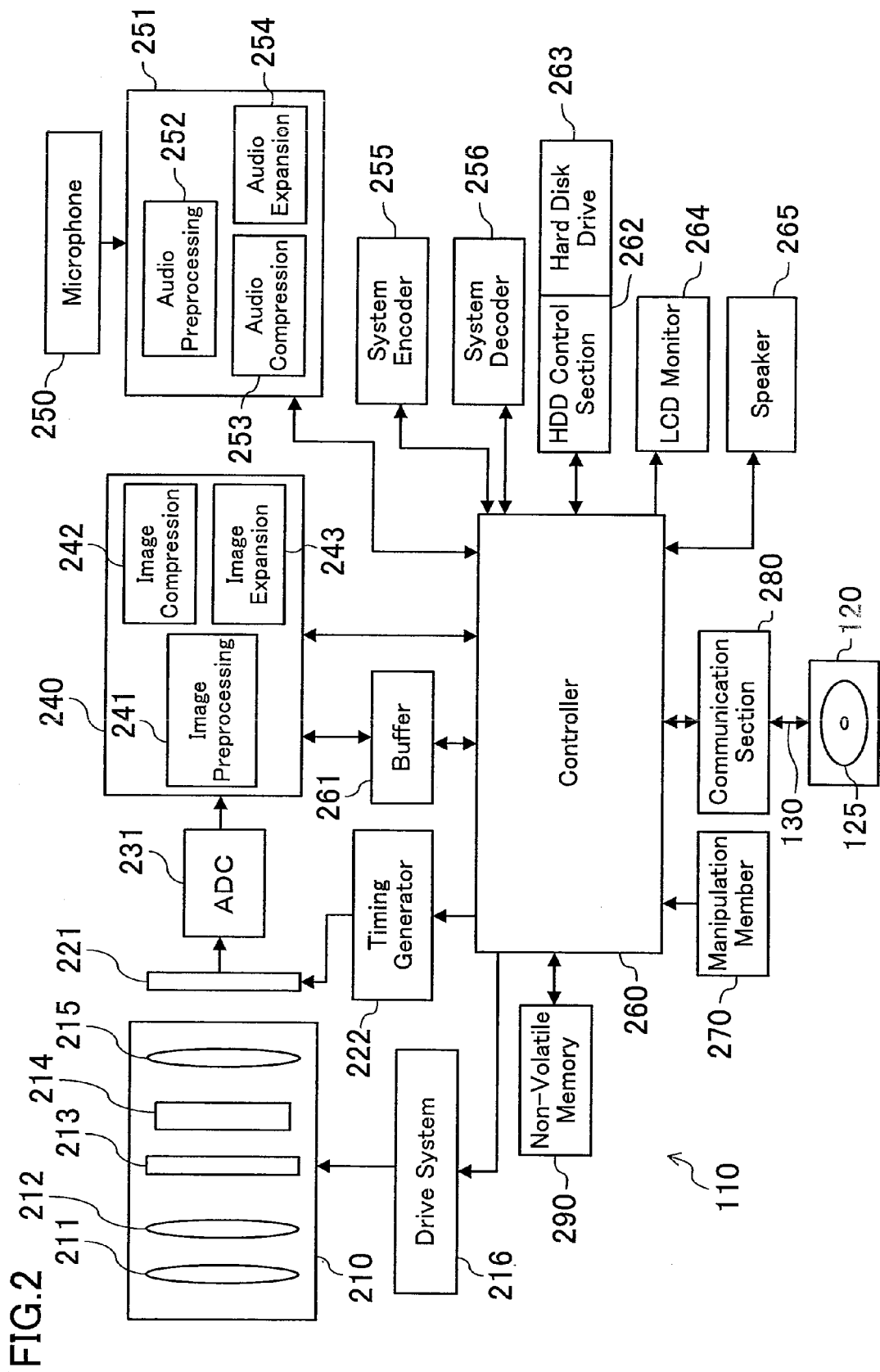
FIG. 2 is a block diagram illustrating details of a structure of a video camera.

FIG. 2 is a block diagram illustrating details of a structure of a video camera 110.

The video camera 110 captures an object image formed by an optical system 210, by an imaging device 221. Image data generated by the imaging device 221 receives various image processing operations in an image processing section 240. Audio data captured by a microphone 250 receives various audio processing operations in an audio processing section 251.

Image data processed in the image processing section 240 and audio data processed in the audio processing section 251 receive system encoding in a system encoder 255, and are stored on a hard disk drive 263. Of an A/V file stored on the hard disk drive 263 etc., video data can be displayed in a liquid crystal display (LCD) monitor 264, and audio data can be output through a speaker 265.

The optical system 210 includes an objective lens 211, a zoom lens 212, a stop 213, an OIS (Optical Image Stabilization) unit 214, and a focusing lens 215. The optical system 210 collects light from the object, and forms an object image. A drive system 216 drives each optical element in the optical system 210.

The imaging device 221 captures the object image formed in the optical system 210, and generates image data. The imaging device 221 is, for example, a CCD (Charge Coupled Device) image sensor or a CMOS (Complementary Metal Oxide Semiconductor) image sensor. A timing generator 222 generates a timing signal to drive the imaging device 221. The imaging device 221 performs various operations of exposure, transfer, an electronic shutter, etc. according to the timing signal generated by the timing generator 222. An AD (Analog-to-Digital) converter 231 converts the image data generated by the imaging device 221 to a digital signal.

The image processing section 240 performs various processing operations on the image data converted by the AD converter 231. The image processing section 240 generates image data to be input to the system encoder 255, or generates image data to be displayed in the LCD monitor 264. Also, the image processing section 240 performs image processing operations on image data output from a system decoder 256, and generates image data to be displayed in the LCD monitor 264, or generates image data to be input again to the system encoder 255. The image processing section 240 can be implemented with a DSP (Digital Signal Processor), a microcomputer, etc.

An image preprocessing section 241 performs various image processing operations such as gamma correction, white balance correction, artifact correction, etc. on the image data converted by the AD converter 231.

An image compression section 242 compresses image data by performing DCT (Discrete Cosine Transform), Huffman encoding, etc. The image compression section 242 compresses image data by a compression format complying with, for example, MPEG (Motion Picture Experts Group)-2 or H.264 standard. Note that the system 100 may handle any data without limitation to data having a format complying with MPEG-2 or H.264.

In cases where compressed image data output from the system decoder 256 is reproduced in the LCD monitor 264, etc., an image expansion section 243 decodes this image data to a non-compressed state.

The microphone 250 captures sound and generates audio data. In order to support an input of stereo audio or multi-channel audio, the microphone 250 may include a plurality of microphone units.

The audio processing section 251 performs various processing operations on the audio data from the microphone 250. The audio processing section 251 generates audio data to be input to the system encoder 255, or generates audio data to be output to the speaker 265. The audio processing section 251 performs audio processing operations on audio data output from the system decoder 256, and generates audio data to be output to the speaker 265, or generates audio data to be input again to the system encoder 255. The audio processing section 251 can be implemented with a DSP, a microcomputer, etc.

An audio preprocessing section 252 converts analog audio data captured by the microphone 250, and generates audio data of a digital signal. The audio preprocessing section 252 may perform various audio processing operations such as generation of stereo audio and multi-channel audio, etc.

An audio compression section 253 compresses audio data by a compression format complying with, for example, MP3 (MPEG-1 Audio Layer-3), AAC (Advanced Audio Coding), etc. Note that the system 100 may handle audio data of any suitable compression format, without limitation to audio data complying with MP3 or AAC.

In cases where compressed audio data output from the system decoder 256 is output through the speaker 265, an audio expansion section 254 decodes this audio data to a non-compressed state.

The system encoder 255 generates an A/V file to be stored on the hard disk drive 263, from compressed image data which the image processing section 240 outputs, and from compressed audio data which the audio processing section 251 outputs.

The system decoder 256 decodes an A/V file stored on the hard disk drive 263, and generates compressed image data and compressed audio data. The system decoder 256 outputs the generated compressed image data to the image expansion section 243, and the generated compressed audio data to the audio expansion section 254, respectively.

A controller 260 controls the entire video camera 110. The controller 260 can be implemented by hardware, software, or a combination of hardware and software. The controller 260 manages and controls various functions of the video camera 110.

A buffer memory 261 serves as a work memory for the controller 260 and the image processing section 240. The buffer memory 261 can be implemented by, for example, a DRAM (Dynamic Random Access Memory), etc.

A non-volatile memory 290 stores information which needs to be held even after powering off. The non-volatile memory 290 may be, for example, a flash memory, a ferroelectric memory, etc.

A hard disk drive (HDD) control section 262 controls a data write operation onto the nard disk drive 263 and a data read operation from the hard disk drive 263. In the system 100, the video camera 110 integrates the hard disk drive 263 in a non-removable manner. However, the video camera 110 is not limited to such a configuration, but may use a removable semiconductor memory card, a removable hard disk, etc. as an internal media. The hard disk drive 263 is one example of an "internal media" described above included in the video camera 110.

The LCD monitor 264 can display image data generated by the imaging device 221 and image data in an A/V file read from the hard disk drive 263, etc. Also, the LCD monitor 264 can display various configuration information of the video camera 210, the time of image capturing, etc.

The speaker 265 can output audio data captured by the microphone 250 and audio data in an A/V file read from the hard disk drive 263, etc.

A manipulation section 270 may include various input devices. The manipulation section 270 generates an input signal corresponding to a user instruction, and outputs the input signal to the controller 260.

A communication section 280 communicates with an external storage device (typically, the DVD writer 120). In other words, the communication section 280 serves as a transmitter and a receiver to send/receive data to/from the video camera 110. The communication section 280 may be implemented by, for example, a USB communication unit. Instead of a USB communication unit, the communication section 280 may be an HDMI communication unit, etc.

(File System)

Figure 3:
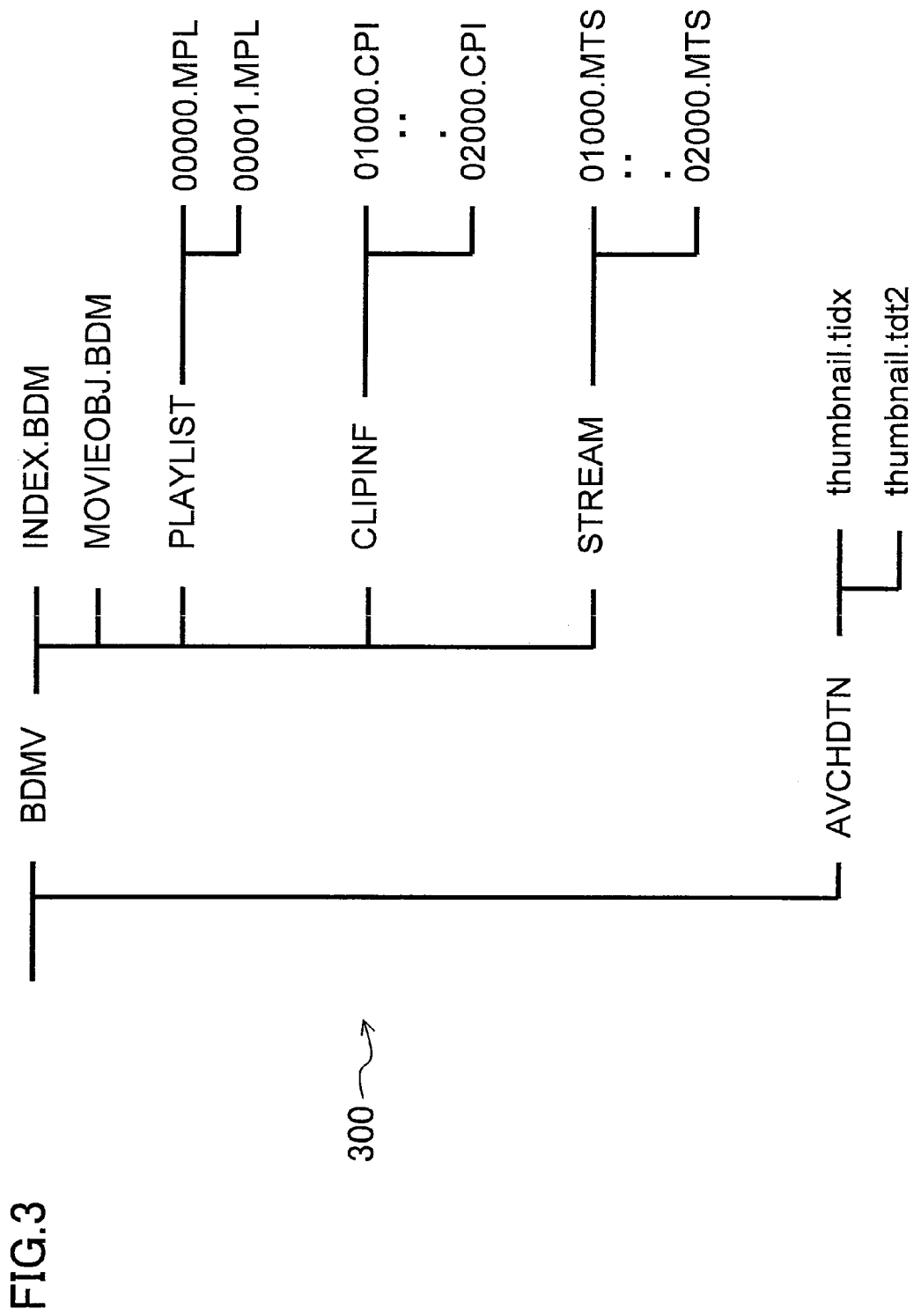
FIG. 3 is a schematic diagram of a file system complying with AVCHD standard, which may be used with the system.

FIG. 3 is a schematic diagram of a file system 300 complying with AVCHD (Advanced Video Codec High Definition) standard, which may be used with the system 100. AVCHD is a standard for storing high-definition video using a video camera. In AVCHD, H.264/MPEG-4 AVC technology is adopted for video encoding, and Dolby Digital (AC-3) technology is adopted for audio encoding. Note that a file system which may be used with the system 100 is not limited to AVCHD-compliant one. Other suitable file systems, including AVCHD Lite-compliant ones, may be used with the system 100.

The file system 300 has two directories: BDMV and AVCHDTN. The directory BDMV has two files INDEX.BDM and MOVIEOBJ.BDM, and three subdirectories PLAYLIST, CLIPINF, and STREAM.

Under the subdirectory PLAYLIST, an MPL file (xxxxx.MPL) is created for each day of image capturing. Under the subdirectory CLIPINF, a CPI file (xxxxx.CPI) corresponding to one captured scene is created. A CPI file manages an MTS file of the same number (xxxxx). A CPI file has a file size on the order of several KBs.

Under the subdirectory STREAM, an MTS file (xxxxx.MTS) corresponding to one captured scene is created. An MTS file includes captured A/V data, and is created each time one scene is captured. An MTS file may have a file size up to 4 GB. The subdirectory STREAM may include up to 4,000 MTS files. Under the directory AVCHDTN, thumbnail files are created.

A file system (FS) management information described below associates the elements (directories, subdirectories, files, etc.) constituting the file system 300 with the locations of these elements on a media. In other words, FS management information describes a directory structure.

(File Transfer)

When an object is imaged using the video camera 110, the imaging device 221 captures an object image formed by the optical system 210 and generates image data. The AD converter 231 converts the image data generated by the imaging device 221 to a digital signal. The image preprocessing section 241 performs gamma correction, white balance correction, etc. on the digital signal, and the image compression section 242 compresses the image data. The microphone 250 captures sound and generates audio data. The audio preprocessing section 252 converts the audio data generated by the microphone 250 to a digital signal, the audio compression section 253 compresses the digital audio data. The system encoder 255 generates an A/V file from compressed image data and audio data. The HDD control section 262 controls the hard disk drive 263, thereby stores the generated A/V file on the hard disk drive 263.

Figure 4:
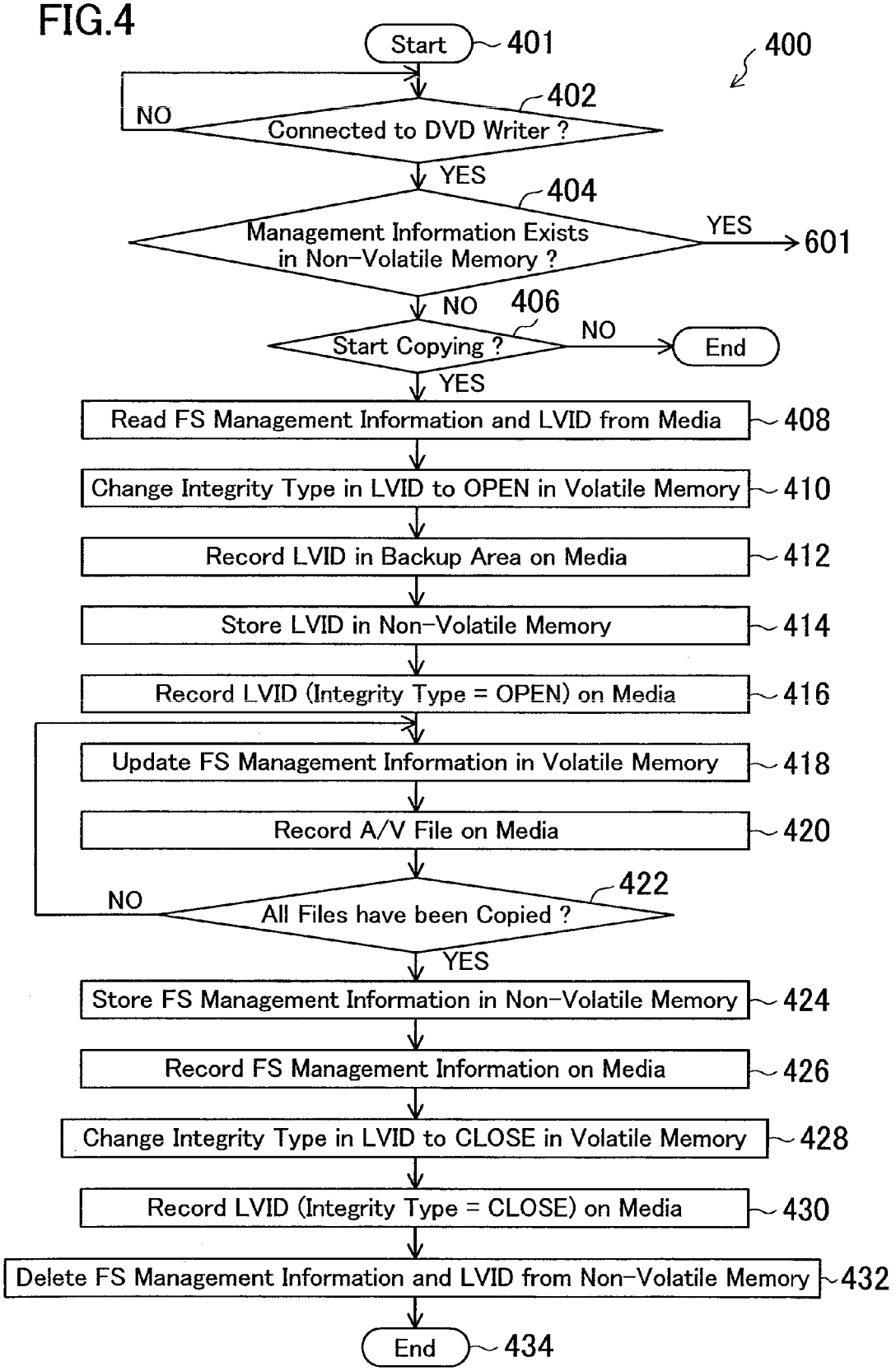
FIG. 4 is a flowchart illustrating a process of a file transfer.

FIG. 4 is a flowchart illustrating a process 400 of a file transfer. Specifically, in the process 400, an A/V file on the hard disk drive 263 of the video camera 110 is transferred to the DVD writer 120, and stored on the DVD 125 (i.e., copied onto the DVD 125).

Figure 5:
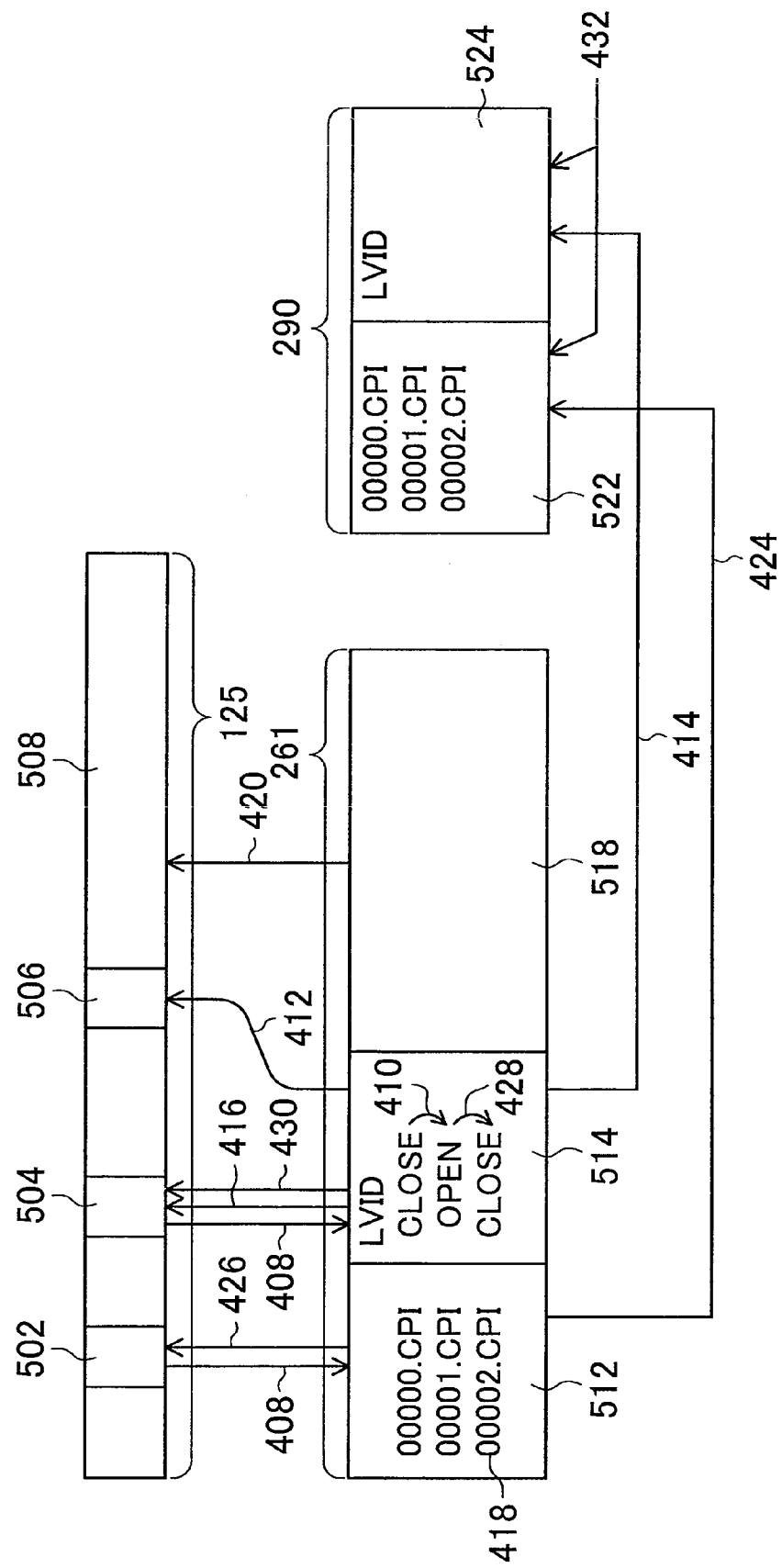
FIG. 5 is a diagram illustrating a data flow in a file transfer shown in the flowchart of FIG. 4.

FIG. 5 is a diagram illustrating a data flow in a file transfer shown in the flowchart of FIG. 4. The DVD 125 has an FS management information area 502, an LVID area 504, an LVID backup area 506, and an A/V file area 508. The buffer memory 261 has an FS management information area 512, an LVID area 514, and an A/V file area 518. The non-volatile memory 290 has an FS management information area 522 and an LVID area 524.

Referring to FIGS. 4 and 5, the process 400 of a file transfer in the system 100 is described below in detail.

At block 401, the video camera 110 is powered on. At block 402, the controller 260 detects, via the communication section 280, that the video camera 110 has been connected to the DVD writer 120.

At block 404, the controller 260 determines whether management information is stored in the non-volatile memory 290 or not. Management information which may be stored in the non-volatile memory 290 includes FS management information and latest storage information (e.g., LVID).

If management information exists in the non-volatile memory 290 (if the determination at block 404 is YES), it is determined that the previous copy operation to the DVD writer 120 was not completed normally. In such case, the process proceeds to block 601 shown in FIG. 6, and the management information on the DVD 125 is recovered as described below. Examples of such case where a copy operation to the DVD writer 120 is not completed normally include a case where the USB cable 130 connecting between the video camera 110 and the DVD writer 120 is unplugged during a copy operation, and a case where the power supply of the DVD writer 120 has been interrupted, etc.

If management information does not exist in the non-volatile memory 290 (if the determination at block 404 is NO), it is determined that the previous copy operation to the DVD writer 120 has been completed normally. Accordingly, the process proceeds to block 406, and the intention of the user to start copying is confirmed.

At block 406, it is determined whether to start copying or not based on an input of the user. If the determination at block 406 is NO, then the procedure terminates. If the determination at block 406 is YES, then the process proceeds to block 408, and a copy operation is started.

At block 408, FS management information read from the FS management information area 502 on the DVD 125 is stored in the FS management information area 512 in the buffer memory 261. An LVID read from the LVID area 504 on the DVD 125 is stored in the LVID area 514 in the buffer memory 261.

At block 410, the Integrity Type in the LVID is changed from CLOSE to OPEN in the buffer memory 261. At block 412, the LVID is stored in the backup area 506 on the DVD 125.

At block 414, the LVID stored in the buffer memory 261 is stored in the non-volatile memory 290. At block 416, the LVID in the buffer memory 261 (Integrity Type=OPEN) is stored in the LVID area 504 on the DVD 125. Therefore, both the LVID in the buffer memory 261 and the LVID on the DVD 125 represent that Integrity Type=OPEN. At this stage, the LVID stored in the backup area 506 and the LVID stored in the non-volatile memory 290 have the same contents.

At block 418, the FS management information in the buffer memory 261 is updated. For example, an entry of 00002.CPI is added to the FS management information area 512. Update operations of the FS management information is not limited to this, but may be deletion of an entry.

At block 420, an A/V file in the buffer memory 261 is stored in the A/V file area 508 on the DVD 125.

At block 422, it is determined whether all the A/V files have been copied or not. If YES, then the process proceeds to block 424. If NO, then the process returns to block 418. Blocks 418 and 420 are executed for each A/V file. For example, if four A/V files captured on a same day are stored on the DVD 125, blocks 418, 420, and 422 are repeated four times.

If it is determined that all the A/V files have been copied at block 422, then at block 424, the FS management information is stored in the non-volatile memory 290. At block 426, the latest FS management information (i.e., FS management information including the entries 00000.CPI-00002.CPI) is stored on the DVD 125. If the copy operation was not completed normally, then the non-volatile memory 290 continues to hold the FS management information. In other words, the FS management information in the non-volatile memory 290 is only deleted when a copy operation has been completed normally. This allows to determine whether the previous copy operation has been completed normally or not, without additionally using a special flag, etc. Such configuration has advantages of simplification of operations, reduction in memory usage, etc.

In an embodiment, block 424, in which FS management information is stored in the non-volatile memory 290, is executed after all the A/V files have been copied. The time required for storing the FS management information in the non-volatile memory 290 is significantly shorter compared with the time required for copying the A/V files. Therefore, considering the probability that a copy operation of an A/V file is interrupted, block 424 is preferably executed after block 422. This increases the possibility that the FS management information stored in the non-volatile memory 290 reflects the actual structure of a file system correctly. In this specification, a condition that the FS management information reflects the actual structure of the file system correctly is referred to as "the FS management information maintains consistency."

At block 428, the Integrity Type in the LVID is changed to CLOSE in the buffer memory 261. At block 430, the LVID in the buffer memory 261 is stored on the DVD 125. At block 432, the FS management information and the LVID in the non-volatile memory 290 are deleted. At block 434, a copy operation of the files is completed.

As described above, at block 432, the FS management information and the LVID in the non-volatile memory 290 are deleted. Therefore, if a transfer of an image file is aborted, an LVID is stored in the non-volatile memory 290. Now, a situation where a transfer of an image file is once again performed after a transfer of the image file has been aborted is considered. In this case, the controller 260 can determine whether the previous transfer of an image file has been aborted or not by checking whether an LVID or FS management information is stored in the non-volatile memory 290 or not.

(Recovery of File System)

Figure 6:
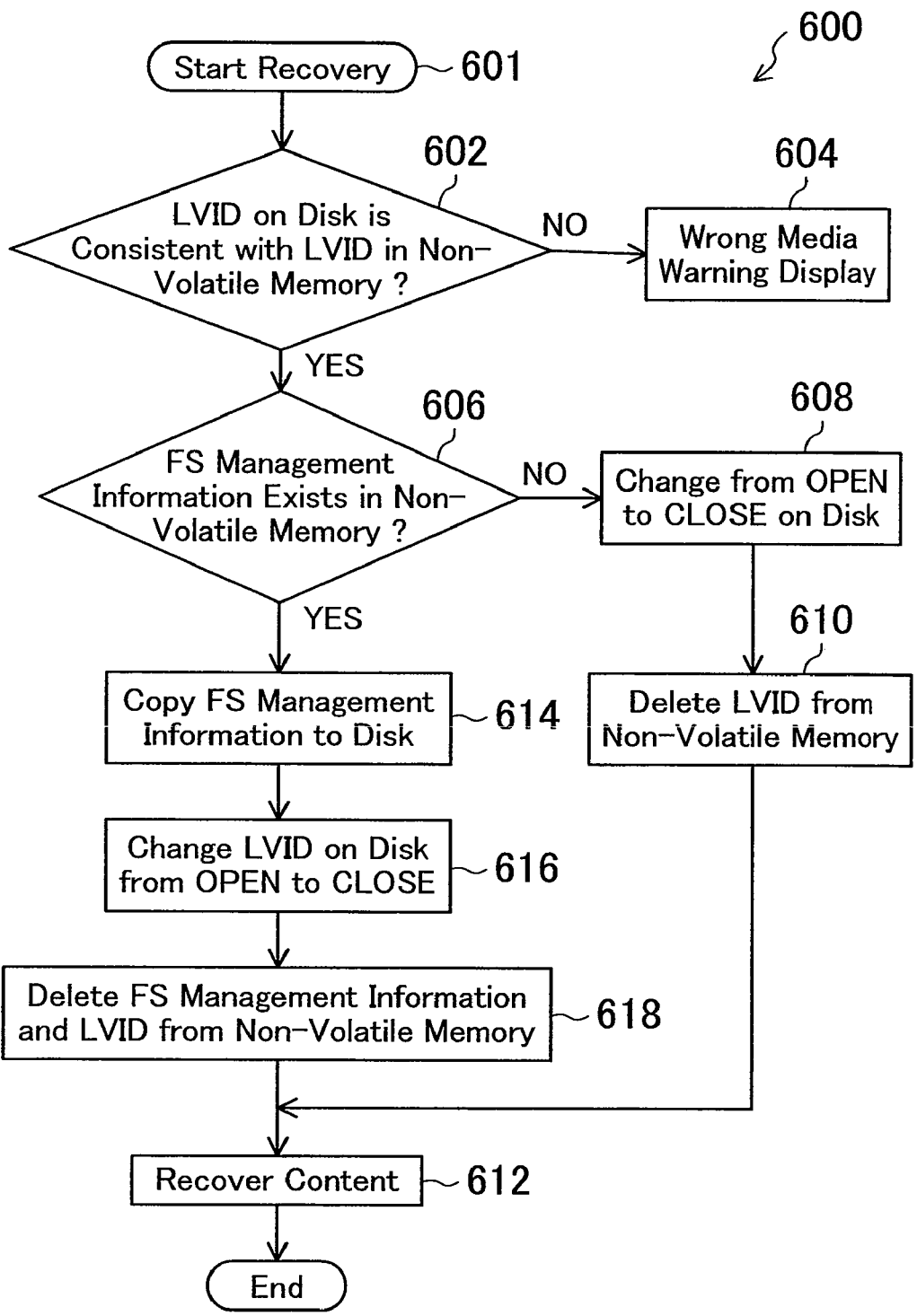
FIG. 6 is a flowchart illustrating a process of recovery of a file system.

FIG. 6 is a flowchart illustrating a process 600 of recovery of a file system. At block 601, the process 600 starts.

At block 602, it is determined whether the LVID on the DVD 125 is identical with the LVID in the non-volatile memory 290 or not. An LVID describes a timestamp of the last change, a file size, etc. Therefore, if these two LVIDs are identical, it is assumed that the same media as the one on which the copy operation was not completed normally has been inserted in the DVD writer 120. If the determination at block 602 is YES, then the process proceeds to block 606, and the file system is recovered. In this embodiment, the LVID in the non-volatile memory 290 is compared with the LVID which has been read from the LVID area 506.

Here, this LVID backup area 506 is provided in a fixed location on the DVD 125. This backup area 506 is arranged in an area which is not usually used in a file system adopted on the DVD 125. In other words, even if a copy operation is interrupted and aborted as a violation of the standard, an LVID is expected to be read from this backup area 506.

If the determination at block 602 is NO, then the process proceeds to block 604, and prompts the user to replace the storage media. In this case, it is assumed that a different media from the one on which the copy operation was not completed normally is now inserted in the DVD writer 120.

Figure 7:
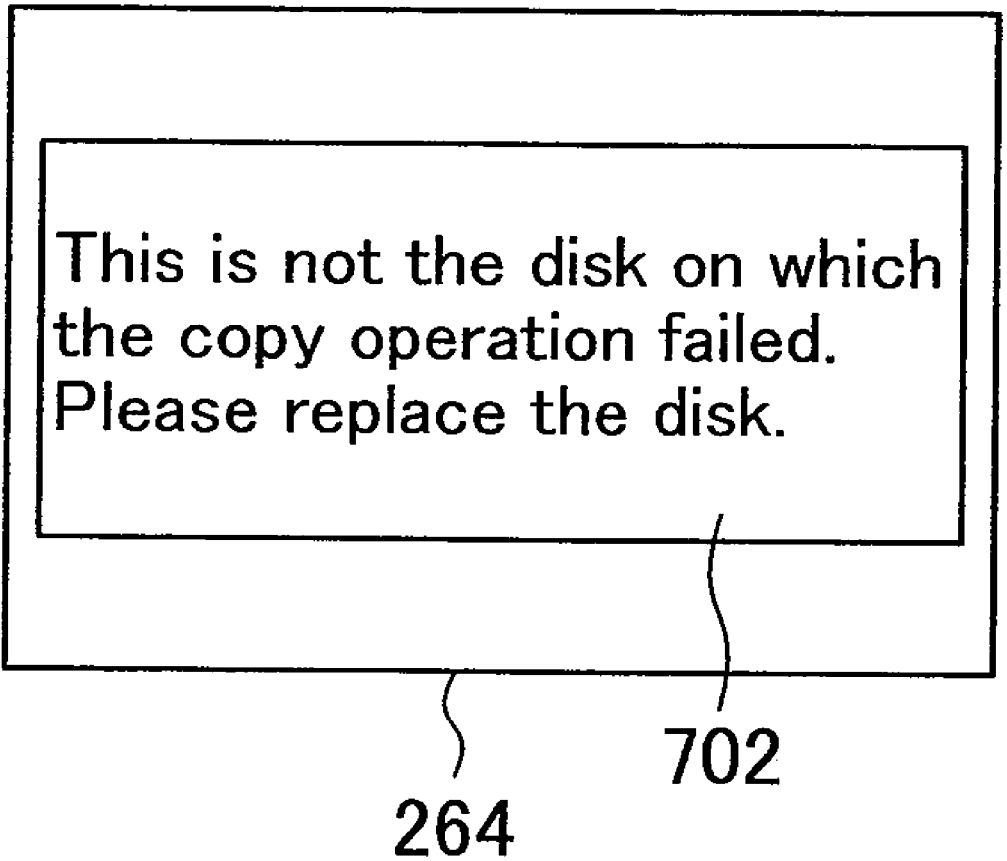
FIG. 7 is a figure illustrating an example of a message for media replacement.

FIG. 7 is a figure illustrating an example of a message for media replacement. At block 604, the LCD monitor 264 displays, for example, a message 702 which prompts the user to replace the media. A message for the user is not limited to a display on the LCD monitor 264, but may be in another manner, such as a method by sound, etc. The user, prompted by such a message, is expected to insert the media on which the copy operation was not completed normally to the DVD writer 120.

At block 606, it is determined whether FS management information is stored in the non-volatile memory 290 or not. If the determination at block 606 is NO, then the process proceeds to block 608, and the Integrity Type in the LVID stored on the DVD 125 is changed to CLOSE. The process proceeds from block 608 to block 610, and the LVID stored in the non-volatile memory 290 is deleted. The process proceeds from block 610 to block 612, and content recovery is performed as necessary.

If the determination at block 606 is YES, then the process proceeds to block 614. At block 614, the FS management information stored in the non-volatile memory 290 is recorded on the DVD 125. That is, the FS management information on the DVD 125 is recovered. With this operation, even if a copy operation to the DVD 125 is aborted, the FS management information is recovered so that a read operation of a file will be possible, thereby allowing for content recovery.

The process proceeds from block 614 to block 616, and the Integrity Type in the LVID recorded on the DVD 125 is changed to CLOSE. The process proceeds from block 616 to block 618, and the FS management information as well as the LVID stored in the non-volatile memory 290 is deleted. The process proceeds from block 618 to block 612, and content recovery is performed as necessary.

(Recovery of Content)

Content recovery at block 612 is performed to ensure consistency of file names, contents of files, etc. Through the recovery process of a file system described above, controller 260 can obtain content management information such as a file name on a file system. This allows the controller 260 to recover the content on a media.

Figure 8:
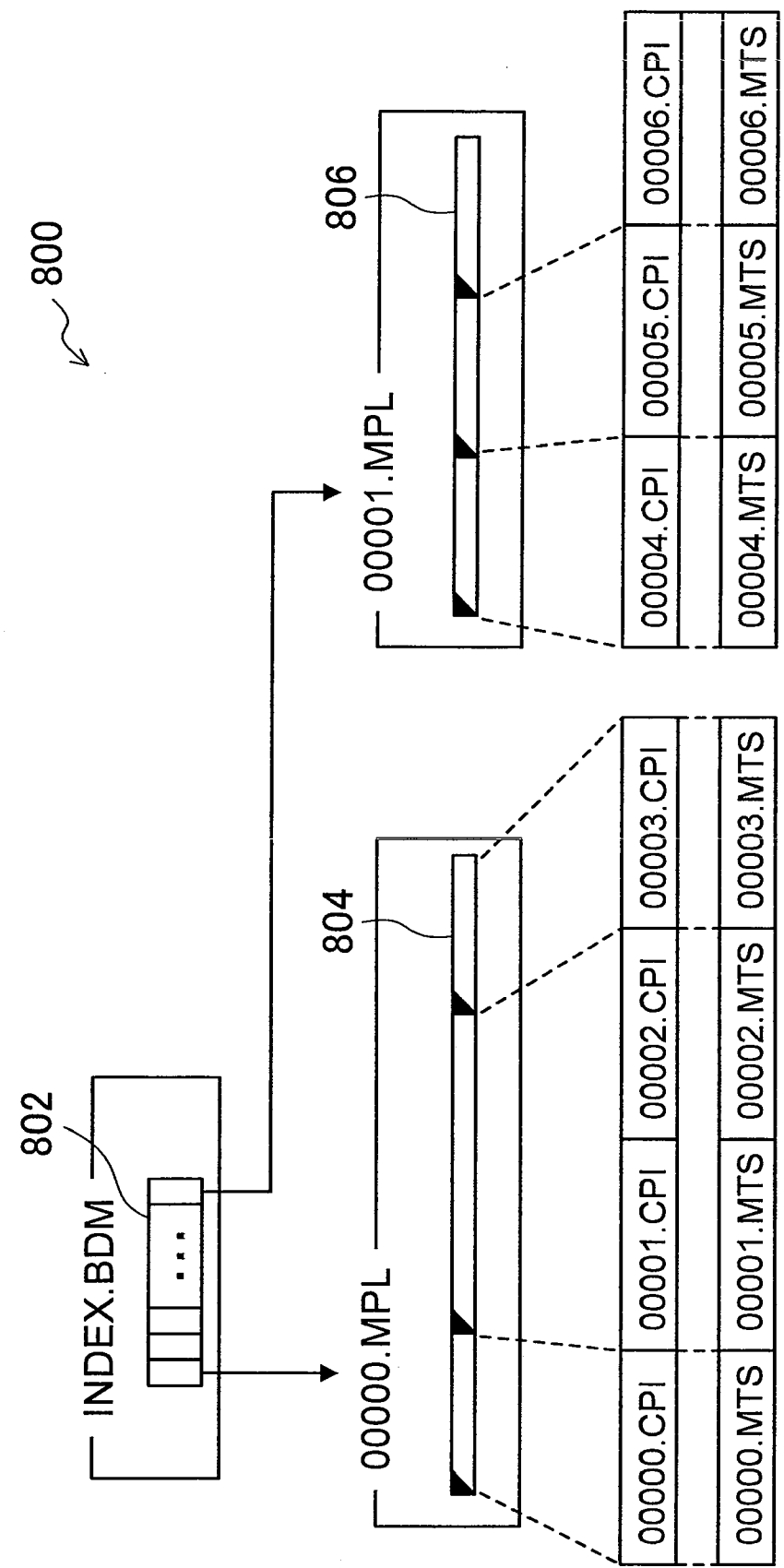
FIG. 8 is a diagram illustrating a relationship between content management information and the content.

FIG. 8 is a diagram illustrating a relationship between content management information and the content. The controller 260 obtains content management information (CPI files) and A/V files (MTS files) on the DVD 125, and performs a recovery operation of the content. The content management information 800 includes INDEX.BDM file. INDEX.BDM file includes a playlist reference table 802. The playlist reference table 802 includes entry-mark reference tables 804 and 806 for each playlist (here, 00000.MPL and 00001.MPL). Based on a last playlist number of the entry-mark reference table 806 (here, 00006), the content of a most recently added playlist is identified. In FIG. 8, the files 00006.CPI and 00006.MTS have not been copied normally. Therefore, these files should be deleted. On the other hand, the files 0000.CPI-00005.CPI and 00000.MTS-00005.MTS have been copied normally. Therefore, latest storage information, content management information, and A/V information is updated on the DVD 125 so as to maintain consistency with these files which should remain on the DVD 125.

In the above example, when a copy operation is interrupted, the A/V files which had been copied normally before the interruption are treated as valid A/V information. The present invention is not limited to such a particular process. For example, when a copy operation is interrupted, a recovery operation may be simplified by deleting all the A/V files which relates to the copy operation. This may allow a recovery operation to be completed in a shorter time.

In the embodiment described above, connection of the video camera 110 to the DVD writer 120 triggers a recovery operation to be performed. In another embodiment, the controller 260 may determine whether management information exists in the non-volatile memory 290 or not when, for example, the video camera 110 is powered on. The existence of management information in the non-volatile memory 290 indicates that a copy operation was not completed normally. The video camera 110 may indicate this to the user.

Figure 9:
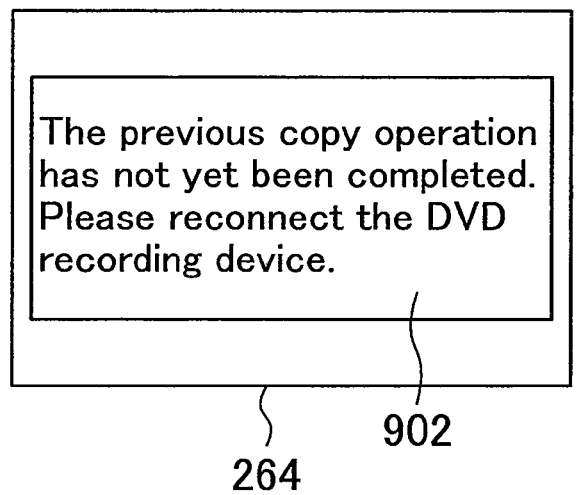
FIG. 9 is a figure illustrating an example of a message which informs the user that a copy operation was not completed normally.

FIG. 9 is a figure illustrating an example of a message which informs the user that a copy operation was not completed normally. The LCD monitor 264 may display, for example, a message as shown in FIG. 9 to the user notifying that the previous copy operation has failed, and thereby prompt to perform recovery. A message for the user is not limited to a display on the LCD monitor 264, but may be in another manner, such as a method by sound, etc.

Figure 10:
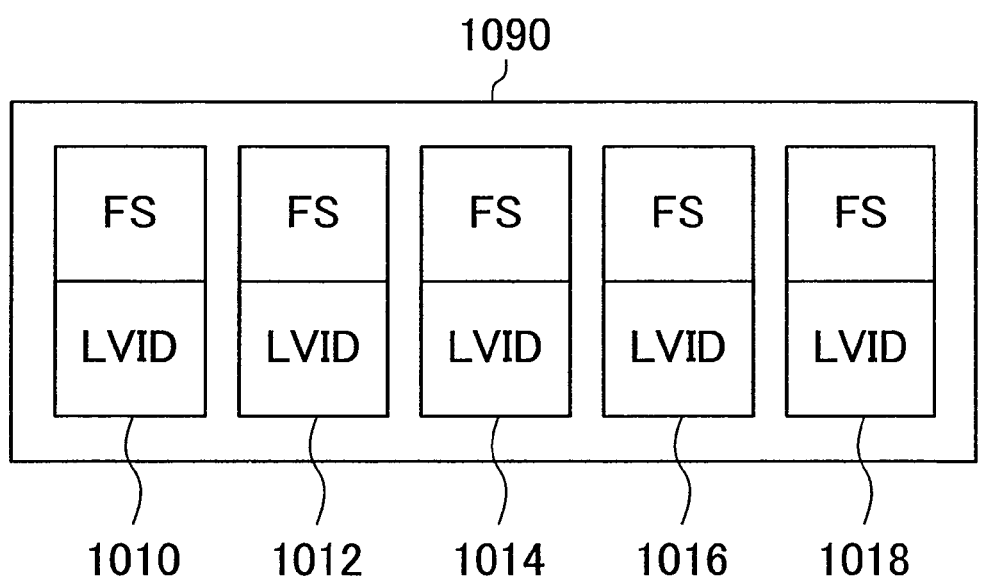
FIG. 10 is a schematic diagram of a non-volatile storage in accordance with another embodiment.

FIG. 10 is a schematic diagram of a non-volatile memory 1090 in accordance with another embodiment. The non-volatile memory 1090 corresponds to the non-volatile memory 290 described above. The non-volatile memory 1090 is different from the non-volatile memory 290 in that the non-volatile memory 1090 stores a plurality of sets of management information corresponding to a plurality of external media (DVDs, etc.). That is, the non-volatile memory 1090 may store management information corresponding to different media in a plurality of areas 1010, 1012, 1014, 1016, and 1018. The number of sets of storable management information is not limited to 5, but generally, n sets (where n is an integer greater than or equal to 1) of management information may be stored.

By using the non-volatile memory 1090, at block 602, the video camera 110 can determine whether the LVID of a media currently inserted is identical with one in any of n media on which write operations have recently been interrupted. In other words, instead of comparing an inserted disk with a single media on which a write operation has been interrupted (602) and performing warning indication (604), it is possible to compare an inserted disk with n media on which write operations have been interrupted (602), and to perform warning indication (604).

In summary, the system 100 can maintain consistency between a file stored on the DVD 125 and management information stored on the DVD 125 by writing back the management information (e.g., FS management information) stored in the non-volatile memory 290 to the DVD 125, even if a write operation to the DVD 125 is interrupted. In other words, even if a write operation to the DVD 125 is interrupted, a file system on the DVD 125 can be recovered. As a result, even for the DVD 125 on which a write operation has been interrupted, at least a read/write operation with a media can be performed after recovery. Thereafter, the content may be recovered based on a file which can now be read from the DVD 125.

A file transfer device of the present invention can improve consistency of management information on a storage media, even if a write operation to the storage media on an external storage device is interrupted. Therefore, it is useful on a data file transfer device which outputs content, such as image information, etc., to an external storage device.

What is claimed is:

1. An image file transfer apparatus, comprising:
a transferor configured to transfer an image file stored on a storage media to an external device;
a retriever configured to obtain management information in relation to a file system from a storage media included in the external device, before the transfer of the image file by the transferor;
an updater configured to update the management information obtained by the retriever based on the image file when transferring the image file;
a non-volatile storage configured to store the management information updated by the updater; and
a deleter configured to delete the management information stored in the non-volatile storage after completing the transfer of the image file by the transferor and after transferring the updated management information to the external device.

2. The image file transfer apparatus of claim 1, further comprising:
a recorder configured to record a backup of the management information stored on the storage media included in the external device onto the storage media included in the external device, before the transfer of the image file by the transferor.

3. The image file transfer apparatus of claim 1, further comprising:
a detector configured to detect whether the management information exists or does not exist in the non-volatile storage, before the transfer of the image file by the transferor;
a determiner configured to determine whether the storage media included in the external device is or is not identical with the storage media onto which the image file was transferred the previous time based on the detected management information, if the detector has detected the management information; and
a display configured to display a message if the determiner has determined that it is not identical.

4. An image file transfer apparatus, comprising:
a transferor configured to transfer an image file stored on a storage media to an external device;
a retriever configured to obtain management information in relation to a file system from a storage media included in the external device, before the transfer of the image file by the transferor;
a non-volatile storage configured to store the management information obtained by the retriever;
a deleter configured to delete the management information stored in the non-volatile storage after completing the transfer of the image file by the transferor;
a detector configured to detect whether the management information exists or does not exist in the non-volatile storage, before the transfer of the image file by the transferor;
a determiner configured to determine whether the storage media included in the external device is or is not identical with the storage media onto which the image file was transferred the previous time based on the detected management information, if the detector has detected the management information; and a display configured to display a message if the determiner has determined that it is not identical.

5. The image file transfer apparatus of claim 4, further comprising:
a recorder configured to record a backup of the management information stored on the storage media included in the external device onto the storage media included in the external device, before the transfer of the image file by the transferor.

* * * * *